United States Patent [19]

Mumola

[11] Patent Number: 5,337,150
[45] Date of Patent: Aug. 9, 1994

[54] APPARATUS AND METHOD FOR PERFORMING THIN FILM LAYER THICKNESS METROLOGY USING A CORRELATION REFLECTOMETER

[75] Inventor: Peter B. Mumola, Huntington, Conn.

[73] Assignee: Hughes Aircraft Company, Los Angeles, Calif.

[21] Appl. No.: 925,721

[22] Filed: Aug. 4, 1992

[51] Int. Cl.$^5$ .............................................. G01B 11/06
[52] U.S. Cl. ..................................... 356/382; 356/357
[58] Field of Search .......................... 356/357, 381, 382

[56] References Cited

U.S. PATENT DOCUMENTS

| | | | |
|---|---|---|---|
| 4,355,903 | 10/1982 | Sandercock | 356/382 |
| 5,101,111 | 3/1992 | Kondo | 356/382 |
| 5,241,366 | 8/1993 | Bevis et al. | 356/382 |

*Primary Examiner*—F. L. Evans
*Attorney, Agent, or Firm*—M. W. Sales; W. K. Denson-Low

[57] ABSTRACT

An apparatus (10) that measures the thickness of a thin film layer of a wafer (12) is described. The thickness of the thin film layer is measured by irradiating a reference wafer (22) with a beam (21) of broadband radiation. The reference wafer (22) has a layer structure similar to that of the wafer (12) undergoing measurement, whereby the thin film layer of the reference wafer (22) that corresponds to the thin film layer to be measured is varied over a specific range of known thicknesses. Thus, the incident beam (21) of broadband radiation is reflected from the reference wafer (22) having a unique spectral signature that corresponds to one of these known thicknesses. A reflected beam (23, 25, 27) of unique spectral radiation is projected onto the wafer (12) undergoing measurement, where it is reflected to produce a beam (29) of unique spectral radiation having a characteristic that is indicative of the thickness of the thin film layer to be measured. The characteristic of the beam (29) of unique spectral radiation is captured by a charge coupled device camera (34), and a computer (36) correlates this captured characteristic with one of the known thin film layer thicknesses of the reference wafer (22) to provide an output that corresponds to the thickness of the thin film layer whose thickness is desired to be measured.

18 Claims, 2 Drawing Sheets

APPARATUS AND METHOD FOR PERFORMING THIN FILM LAYER THICKNESS METROLOGY USING A CORRELATION REFLECTOMETER

BACKGROUND OF THE INVENTION

1. Field of the Invention

The present invention relates to methods for performing thin film layer thickness metrology and, more particularly, to an apparatus and method for performing thin film layer thickness metrology on a silicon/silicon dioxide/silicon (Si/SiO$_2$/Si) structured semiconductor wafer using a correlation reflectometer.

2. Description of the Prior Art

In one particular application wherein the present invention is especially practical, a silicon-on-insulator (SOI) semiconductor wafer, typically consisting of an Si/SiO$_2$/Si sandwich structure, is fabricated by growing a silicon dioxide (SiO$_2$) film on one surface of each of two silicon (Si) wafers and bonding the two silicon dioxide film surfaces together at high temperature. The SOI wafer then undergoes a further fabrication process, wherein an outer surface of one of the two silicon wafers in the sandwich structure is mechanically ground and polished to an average thickness of several microns. This mechanical grinding and polishing unfortunately results in large spatial variations in the thickness of this one silicon wafer, or this one outer silicon layer. To reduce these spatial variations, a thickness map that indicates thickness non-uniformities in this outer silicon layer over the entire wafer surface is required, for example, to initialize a subsequent micropolishing process.

A thickness map is obtained by measuring the spatial variations in the thickness of the outer silicon layer over the entire outer silicon layer surface. A sequence of measuring these spatial variations followed by thinning and smoothing the surface of this outer silicon layer by micropolishing may need to be performed several times before the entire outer silicon layer achieves a desired thickness. Due to the precision of a typical micropolishing instrument and in order to reduce costs and increase wafer production, a thickness measurement of at least 400 points on the outer silicon layer surface in 60 seconds or less is desirable.

Current commercial instruments can typically provide a thickness measurement of a thin film layer at a single point on the surface of the thin film layer. These instruments use a focused lens or a fiber bundle to locally illuminate the thin film layer surface with a beam of monochromatic light, and a grating or prism spectrograph to measure the surface spectral reflectance at each point. In all cases, this surface spectral reflectance data must be numerically corrected due to variations in the angle of incidence caused by the f-number of the illuminating beam. Also, the time required for these instruments to determine the thickness of an outer silicon layer of an SOI semiconductor wafer at a single point thereon is on the order of several minutes, which far exceeds the time desired for efficient wafer production.

These current commercial instruments can be extended to cover an entire thin film layer, such as an outer silicon layer of an SOI semiconductor wafer, by moving either the measuring instrument or the wafer in a controlled manner. However, as when measuring only a single point, the time required for these instruments to characterize an entire outer silicon layer with at least 400 measurement points far exceeds the time desired for efficient wafer production.

A recent advance in the state of the art is described in U.S. patent application Ser. No. 07/804,872, entitled, Apparatus and Method for Measuring the Thickness of Thin films, filed on Dec. 6, 1991, now pending and assigned to the assignee hereof. The above-referenced document describes an instrument that can perform a thin film layer thickness measurement over an entire thin film layer, such as an outer silicon layer of an SOI semiconductor wafer, in a time that is desirable for efficient wafer production. However, a disadvantage of this instrument, as well as with all of the previously described current commercial instruments, is a need for stored calibration or reference spectral data that is compared with measured spectral data so as to derive a "best fit" thin film layer thickness. This stored calibration or reference spectral data is obtained by assuming that the complex index of refraction of the thin film layer to be measured is known over the spectral region of analysis, and therefore the spectral data is subject to error. It is therefore desirable to perform thin film layer thickness metrology over an entire thin film layer, such as an entire outer silicon layer of an SOI semiconductor wafer, in a manner that is efficient, economical, and highly accurate, but does not require the use of stored calibration or reference spectral data.

SUMMARY OF THE INVENTION

The present invention contemplates an apparatus and method for efficiently determining a thin film layer thickness of, for example, an entire thin film layer of a semiconductor wafer without the use of stored calibration or reference spectral data. The thickness of this thin film layer is determined by irradiating a surface of the wafer with radiation from a unique spectral source and by measuring the reflectance characteristics of this radiation over a full aperture of the wafer surface.

The unique spectral source is comprised of a broadband source that emits a beam of broadband radiation that is collimated and then reflected from a reference surface, in this case a semiconductor wafer having a layer structure similar to that of the wafer undergoing measurement, or test. The reference wafer is different from the test wafer, however, in that there is a known variation in the thickness of one of the thin film layers of the reference wafer. This thin film layer of known thickness corresponds to the thin film layer of the test wafer whose thickness is desired to be determined. The collimated beam of broadband radiation is reflected from the surface of the reference wafer at several points over which the thin film layer thickness is known to vary. Thus, the radiation reflected from the reference wafer has a unique spectral signature that corresponds to a known thin film layer thickness of the reference wafer.

The unique spectral radiation reflected from the reference wafer is projected onto the test wafer such that an entire surface of the test wafer is irradiated. This radiation is then reflected from the test wafer just as it was from the reference wafer. However, the intensity of the radiation reflected from the test wafer is directly correlated to how close the layer structures, i.e. the thicknesses of the layers, between the reference wafer and the test wafer, at any particular point on the test wafer, are matched. A maximum intensity occurs in the radiation reflected from the test wafer at the point where the thickness of the "unknown" thin film layer of the test wafer equals the thickness of the "known" thin film layer of the reference wafer, or a best match is found between the layer structures of each wafer. Thus, the reference wafer acts as a matched filter that converts broadband radiation into unique spectral radiation which corresponds to a known thin film layer thickness.

The radiation reflected from the test wafer is projected onto a detector array of a charged coupled device (CCD) camera, where a full aperture image of the test wafer is captured. This full aperture image is captured by digitizing each pixel in the CCD camera detector array according to the intensity of the reflected radiation that is incident at each point thereon. Thus, the intensity of the radiation reflected from every point on the test wafer is known, and this known intensity is correlated with the known thin film layer thickness of the reference wafer to determine the thin film layer thickness at every point on the test wafer.

The primary objective of the present invention is therefore to provide an efficient means for measuring thin film layer thicknesses.

Other objectives and advantages of the present invention will become apparent to those skilled in the art from the following detailed description read in conjunction with the appended claims and the drawings attached hereto.

DETAILED DESCRIPTION OF THE INVENTION

Figure 1:
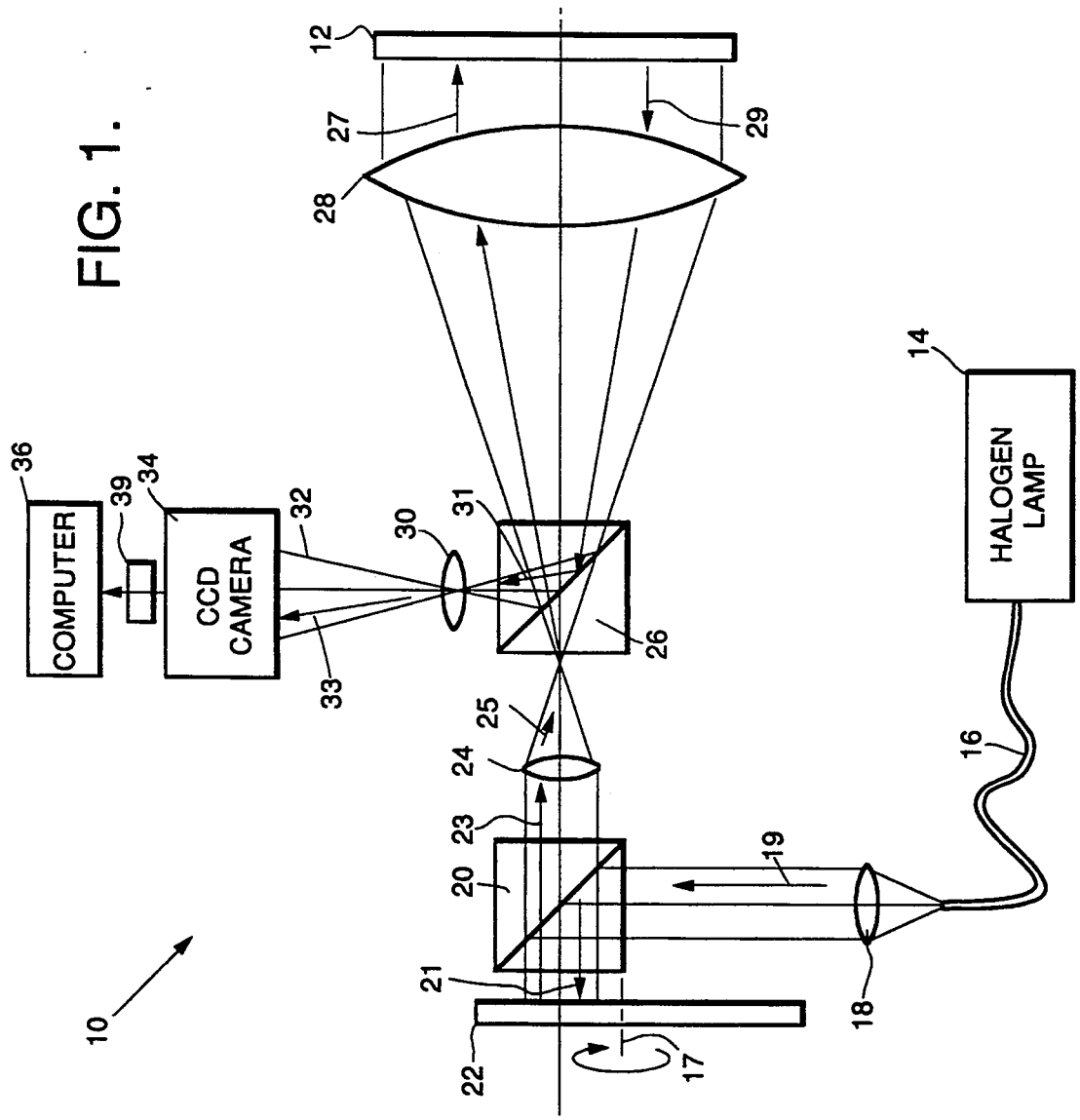
FIG. 1 is schematic representation of a semiconductor wafer thin film layer thickness measuring instrument according to the present invention.

Referring to FIG. 1, there is shown an apparatus, generally indicated by the numeral 10, for measuring a thin film layer thickness of a semiconductor wafer 12. For the purpose of this description, the thickness measurement of an outer silicon layer of an SOI semiconductor wafer 12 is described. Of course, a similar apparatus employing the present invention concepts to be described herein can be used to measure thin film thicknesses in general.

The apparatus 10 of FIG. 1 maintains a broadband source that includes a halogen lamp 14 which is connected to a fiber optic light guide 16. The fiber optic light guide 16 carries broadband radiation from the halogen lamp 14 and a collimator lens 18 forms a collimated beam 19 (a single ray is shown to indicate direction) from this carried broadband radiation. The collimated beam 19 of broadband radiation is directed toward a first thin plate beamsplitter 20 which redirects a portion 21 (a single ray is shown to indicate direction) of this collimated beam toward a reference wafer 22.

Figure 2:
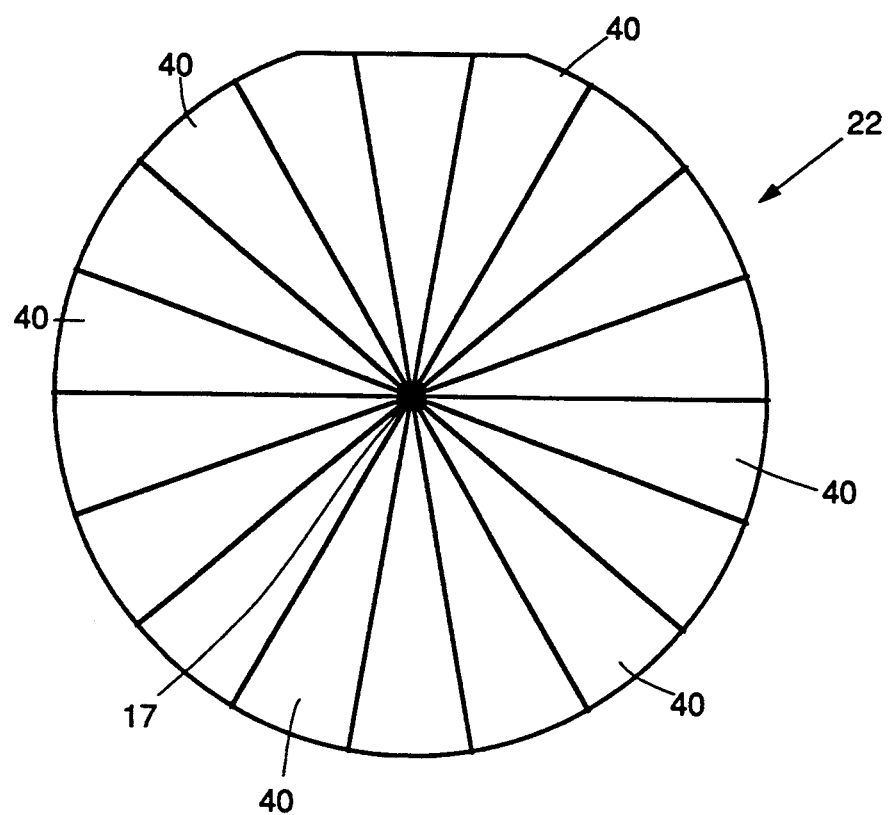
FIG. 2 is a plan view of an SOI semiconductor wafer having sectors with different known outer silicon layer thicknesses.

The reference wafer 22 is an SOI semiconductor wafer having a layer structure similar to that of the SOI semiconductor wafer 12 undergoing measurement, or test. However, the reference wafer 22 is different from the test wafer 12 in that the outer silicon layer of the reference wafer 22 has a known variation in thickness. This thickness variation can be realized by either a gradual or a stepwise axial increase, or decrease depending upon a rotational direction of the reference wafer 22, in the thickness of the outer silicon layer. Referring to FIG. 2, a stepwise increase, or decrease, is shown whereby each sector 40 of the reference wafer 22 has a different known outer silicon layer thickness. Thus, referring back to FIG. 1, as the reference wafer 22 is rotated about its center 17, the redirected portion 21 of the collimated beam is incident upon the reference wafer 22 at areas having different outer silicon layer thicknesses. A result of this rotational change in the area of incident radiation 21 is that a beam 23 (a single ray is shown to indicate direction) of broadband radiation having a unique spectral signature corresponding to the thickness of the outer silicon layer, or the layer structure of the reference wafer 22 in general, is reflected from the reference wafer 22. This unique spectral signature is a result of coherent interactions in the incident broadband radiation 21 as it is reflected between the different material layers within the reference wafer 22 structure.

The beam 23 of unique spectral radiation is proportionally passed through the first thin plate beamsplitter 20 and a condenser lens 24 projects a focused beam 25 (a single ray is shown to indicate direction) of unique spectral radiation proportionally through a second thin plate beamsplitter 26 toward a large collimator lens 28. This large collimator lens 28 produces a collimated beam 27 (a single ray is shown to indicate direction) of unique spectral radiation which irradiates an entire surface of the test wafer 12. Similar to the collimated beam 21 of broadband radiation incident upon the reference wafer 22, the collimated beam 27 of unique spectral radiation is reflected between the different material layers within the test wafer 12, thereby resulting in coherent interactions in this incident radiation. As a result of these coherent interactions, coupled with the unique spectral characteristics of the incident radiation, a reflected beam 29 (a single ray is shown to indicate direction) of collimated radiation is produced having a characteristic indicative of the thickness of the outer silicon layer of the test wafer 12.

The characteristic of the collimated beam 29 of reflected radiation that indicates the thickness of the outer silicon layer of the test wafer 12 is its intensity. As such, the intensity of the beam 29 of reflected radiation is directly correlated to how close the outer silicon layer thicknesses of the reference wafer 22 and the test wafer 12 are matched at any particular point. This correlation is realized by a maximum intensity occurring in the radiation 29 reflected from the test wafer 12 at each point where the outer silicon layer thickness of the test wafer 12 is most closely matched with the outer silicon layer thickness of the reference wafer 22. The points on each wafer 12, 22 are matched by way of the beam 23 of unique spectral radiation being reflected from an area on the reference wafer 22 having a known outer silicon layer thickness, and by way of this beam 23, or a portion 27 thereof, being projected onto an area of the test wafer 12 having an unknown outer silicon layer thickness. Specifically, each cross-sectional point in the beam 23 of unique spectral radiation has a unique spectral signature corresponding to a particular outer silicon layer thickness of the reference wafer 22. When this beam 23 of unique spectral radiation, or a portion 27 thereof, is projected onto the test wafer 12, the reflectance of this beam 27 at each point on the test wafer 12 is at a maximum when the unique spectral signature of the beam 27 at its cross-sectional point of incidence on the test wafer 12 corresponds to the outer silicon layer thickness of the reference wafer 22 that most closely matches the outer silicon layer thickness of the test wafer 12 at that point. It should be noted that although the present case deals only with an outer silicon layer, the above-described correlation reflectance scheme may also be applied to an internal, or buried, layer as well, provided the thickness of the buried layer in the reference wafer is known.

The beam 29 of radiation reflected from the test wafer 12 is passed through the large collimator lens 28 and is directed back toward the second thin plate beamsplitter 26. A portion 31 (a single ray is shown to indicate direction) of this reflected beam 29 is redirected by the thin plate beamsplitter 26 toward an imaging lens 30. The imaging lens 30 projects a full aperture image of the test wafer 12, by way of a portion 33 (a single ray is shown to indicate direction) of the radiation reflected from the test wafer 12, onto a detector array 32 of a charge coupled device (CCD) camera 34. This full aperture image is then captured by digitizing each pixel in the CCD camera detector array 32 by means for digitizing 39 according to the intensity of the radiation 33 that is incident at each point thereon. Thus, the intensity of the radiation 29 reflected from every point on the test wafer 12, or a portion 33 thereof, is captured, or known. This known intensity is then correlated with the known outer silicon layer thickness of the reference wafer 22 to determine the outer silicon layer thickness at every point on the test wafer 12. The correlation between the known intensity and the known outer silicon layer thickness is generally performed by a computer 36. The computer 36 also stores the test wafer 12 outer silicon layer thickness for display or to provide an output that indicates this thickness.

It is thus seen that the objectives set forth above are efficiently attained and, since certain changes can be made in the above-described apparatus without departing from the scope of the invention, it is intended that all matter contained in the above description or shown in the accompanying drawing shall be interrupted as illustrative and not in a limiting sense.

What is claimed is:

1. A method for measuring the thickness of a test layer of material having a front and a rear surface, wherein said material of said layer has a property that allows radiation to be transmitted therethrough, said method comprising the steps of:

providing a reference layer of material having a front and a rear surface, wherein said material of said reference layer has a property like that of said layer of material undergoing measurement, wherein the thickness of said reference layer of material varies over a specific range of known thicknesses, and wherein the thickness of said layer of material undergoing measurement falls within said specific range of knows thickness;

irradiating said front surface of said reference layer of material with collimated broadband radiation, wherein said collimated broadband radiation is reflected from said front and rear surfaces of said reference layer of material to provide reflected reference radiation having a unique spectral signature that corresponds to the thickness of said reference layer of material;

receiving and collimating said reflected reference radiation to provide collimated reference radiation;

projecting said collimated reference radiation onto said front surface of said layer of material undergoing measurement, wherein said reference radiation is reflected from said front and rear surfaces of said test layer of material undergoing measurement to provide reflected test radiation having a characteristic that is indicative of the thickness of said layer of material undergoing measurement;

receiving said reflected test radiation having said thickness indicative characteristic for a full aperture image of said test layer;

detecting said thickness indicative characteristic correlating said thickness indicative characteristic with one of said thicknesses in said specific range of known thicknesses of said reference layer of material; and providing an output that corresponds to the thickness of said layer of material undergoing measurement.

2. The method as defined in Claim 1, wherein said step of detecting said thickness indicative characteristic comprises detecting said characteristic using a charge coupled device camera, wherein said charge coupled device camera provides an output signal that corresponds to said characteristic, and wherein said method includes the additional steps of:

digitizing and output signal provided by said charge coupled device camera; and correlating said digitized output signal with one of said thickness in said specific range of known thickness of said reference layer of material.

3. The method as defined in claim 1 wherein said step of irradiating includes the steps of:

providing a source of broadband radiation; and using a fiber optic guide, collimator lens, and a beamsplitter arrangement to receive the broadband radiation and direct the collimated broadband radiation onto said reference layer of material.

4. The method as defined in claim 1 wherein said step of receiving reflected test radiation includes the step of providing a lens and beamsplitter arrangement to project test radiation onto a detector array.

5. The method as defined in claim 1 wherein said step of detecting said characteristic includes the step of displaying a test image of the intensity of the reflected test radiation for the entire test layer.

6. The method as defined in claim 1 wherein said steps of correlating and providing an output includes the steps of:

digitizing said test image; and correlating said digitized test image to the thickness of the test layer.

7. The method as defined in claim 1 wherein said receiving said reflected test radiation includes providing a detector array.

8. A method as defined in claim 1 wherein said receiving and collimating said reflected reference radiation and said projecting said collimated reference radiation includes the step of using a beamsplitter and lens arrangement.

9. An apparatus for measuring the thickness of a test layer of material, said apparatus comprising:

means for irradiating a reference layer with collimated broadband radiation to provide reflected reference radiation;

means for receiving and collimating said reflected reference radiation to provide collimated reference radiation;

means for projecting collimated reference radiation onto said test layer to provide reflected test radiation;

means for receiving said test radiation to provide a full aperture image of said test layer and for providing signals indicative of the intensity of reflected test radiation over the entire test layer; and means for correlating said signals to the thickness of said reference layer to determine the thickness of said layer.

10. The apparatus as defined in claim 9, wherein said means for irradiating comprises:

means for providing a source of broadband radiation;

a fiber optic light guide for carrying said broadband radiation from said source;

a collimator lens for collimating said broadband radiation after it has been carried over said fiber optic light guide; and a thin plate beamsplitter for directing a portion of said collimated broadband radiation onto said front surface of said reference layer.

11. The apparatus as defined in claim 9, wherein said means for projecting comprises a lens and beamsplitter arrangement.

12. The apparatus as defined in claim 9, wherein said test layer undergoing measurement is one of a plurality of thin film layers formed on a substrate, wherein said reference layer is also one of a plurality of thin film layers formed on a substrate, and wherein the layer structure and substrate of said test layer undergoing measurement are similar to that of the layer structure and substrate of said reference layer.

13. The apparatus as defined in claim 12, wherein said material of said test layer to be measured and said material of said reference layer are comprised of silicon, and wherein said substrates are comprised of silicon.

14. The apparatus as defined in claim 9 further comprising:

a display for receiving the intensity signals to provide a test image indicative of the intensity of reflected test radiation and thereby the thickness, of the test layer.

15. The apparatus as defined in claims 14 wherein said means for receiving said test radiation and providing intensity signals and said display includes a CCD camera.

16. The apparatus as defined in claim 9 further comprising:

means for digitizing said signals or test image to provide digitized information; and a computer for correlating the digitized test information to the thickness of the test layer.

17. The apparatus as defined in claim 9 wherein said means for receiving reflected test radiation includes a beamsplitter and lens arrangement.

18. The apparatus as defined in claim 9 wherein said means for receiving said test radiation includes a detector array.

* * * * *